United States Patent
Al-Taq et al.

(10) Patent No.: US 11,866,643 B1
(45) Date of Patent: Jan. 9, 2024

(54) METHOD AND COMPOSITION TO REMOVE LIQUID BUILD UP IN GAS WELLS

(71) Applicant: SAUDI ARABIAN OIL COMPANY, Dhahran (SA)

(72) Inventors: Ali Abdullah M. Al-Taq, Qatif (SA); Abdullah A. Alrustum, Al-Taraf (SA); Luai A. Alhamad, Dammam (SA); Hussain A. Al-jeshi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/048,228

(22) Filed: Oct. 20, 2022

(51) Int. Cl.
*E21B 43/34* (2006.01)
*C09K 8/592* (2006.01)
*E21B 43/12* (2006.01)
*C09K 8/588* (2006.01)
*C09K 8/584* (2006.01)

(52) U.S. Cl.
CPC .............. *C09K 8/592* (2013.01); *C09K 8/584* (2013.01); *C09K 8/588* (2013.01); *E21B 43/13* (2020.05)

(58) Field of Classification Search
CPC ......... C09K 8/592; C09K 8/584; E21B 43/13; E21B 43/34
USPC ....................................................... 166/300
See application file for complete search history.

(56) References Cited

U.S. PATENT DOCUMENTS

| 4,410,041 A | 10/1983 | Davies |
| 4,846,277 A * | 7/1989 | Khalil .................... C09K 8/703 166/280.1 |
| 8,613,313 B2 | 12/2013 | Ziauddin |

(Continued)

FOREIGN PATENT DOCUMENTS

| BR | PI 1005868 A2 | 4/2013 |
| CN | 1076758 A | 9/1993 |

(Continued)

OTHER PUBLICATIONS

Alade et al., "Evaluation of kinetics and energetics of thermochemical fluids for enhanced recovery of heavy oil and liquid condensate," Energy & Fuels, Apr. 2019, 27 pages.

(Continued)

*Primary Examiner* — Zakiya W Bates
*Assistant Examiner* — Ashish K Varma
(74) *Attorney, Agent, or Firm* — Osha Bergman Watanabe & Burton LLP

(57) ABSTRACT

A method for removing liquid buildup in gas wells may include introducing a first aqueous solution and a second aqueous solution into the wellbore such that the first aqueous solution and the second aqueous solution may intermix within the wellbore. The first aqueous solution may contain a nitrogen-containing compound and the second aqueous solution may contain a nitrite-containing compound and a foaming agent. The method may further include maintaining the intermixed solution in the wellbore such that gas, heat, and foam may be generated, and removing the excess fluid from the wellbore. Furthermore, the method may include (Continued)

introducing an acid or acid precursor into the wellbore, releasing an acid from the acid precursor into the intermixed solution, and maintaining the acid with the intermixed solution in the wellbore to adjusted the pH of the intermixed solution to less than 7.0.

16 Claims, 5 Drawing Sheets

(56) References Cited

U.S. PATENT DOCUMENTS

| | | | |
|---|---|---|---|
| 9,890,321 B2* | 2/2018 | Shumway | C09K 8/74 |
| 10,030,492 B2 | 7/2018 | Al-Nakhil | |
| 10,053,614 B2 | 8/2018 | Al-Nakhli | |
| 10,308,862 B2* | 6/2019 | Al-Nakhli | C09K 8/532 |
| 10,927,291 B2 | 2/2021 | Al-Taq | |
| 10,961,833 B2 | 3/2021 | Al-Nakhli | |
| 10,975,293 B2 | 4/2021 | Al-Taq | |
| 11,208,877 B2 | 12/2021 | Al-Nakhli | |
| 11,299,663 B2 | 4/2022 | Al-Taq | |
| 2015/0361328 A1* | 12/2015 | Almutairi | E21B 43/24 166/300 |
| 2019/0185738 A1 | 6/2019 | Al-Nakhli | |
| 2021/0024809 A1 | 1/2021 | Ba Geri | |
| 2021/0024815 A1* | 1/2021 | Al-Taq | C09K 8/80 |

FOREIGN PATENT DOCUMENTS

| | | |
|---|---|---|
| CN | 102536166 B | 1/2015 |
| CN | 104790933 A | 7/2015 |
| CN | 105114046 A | 12/2015 |
| EP | 2981588 B1 | 5/2018 |

OTHER PUBLICATIONS

Al-Taq et al., "First Successful Filtercake Damage Removal Treatment Utilizing In-situ Nitrogen/Heat Generating system for Relatively Heavy Oil Wells," Society of Chemical Engineers, SPE-170832-MS, Oct. 2014, 9 pages.

Lea et al., "Solving Gas-Well Liquid-Loading Problems," Society of Petroleum Engineers, SPE 72092, Apr. 2004, 7 pages.

Shojaei et al., "Foam Stability Influenced by Displaced Fluids and by Pore Size of Porous Media," a) Industrial & Engineering Chemistry Research, Dec. 20, 2018, 8 pages.

Suffridge et al., "Foam Performance Under Reservoir Conditions." Society of Petroleum Engineers, SPE 19691, Oct. 1989, 9 pages.

Tariq et al., "An Experimental Study to Reduce the Fracture Pressure of High Strength Rocks Using a Novel Thermochemical Fracturing Approach," Geofluids, Aug. 2019, 17 pages.

Veeken et al., "Evaluating Performance of Foam-Assisted Lift in Sultanate of Oman by Dedicated Field Testing," Society of Petroleum Engineers, SPE 188223-MS, Nov. 2017, 20 pages.

Vikingstad et al., "Foam-oil interactions analyzed by static foam tests," Colloids and Surfaces A: Physicochem Eng Aspects 260: 189-198, 2005, 10 pages.

Wu et al., "Foaming Agent Developed for Gas Wells with Liquid Loading Problem Using New Surfactant and Nanotechnology," Society of Petroleum Engineers, SPE-201239, Dec. 2020, 7 pages.

Dong et al., "Laboratory Experimental Research on Promoting Aquathermolysis of Heavy Oil with the NaNO2/NH4Cl Exothermic System," Advanced Materials Research vol. 772 (2013) pp. 297-302, 7 pages.

* cited by examiner

METHOD AND COMPOSITION TO REMOVE LIQUID BUILD UP IN GAS WELLS

BACKGROUND

Liquid buildup is an accumulation of excess fluid such as formation fluid, water, gas condensate, etc. that occurs in gas wells. Gas wells with enough reservoir pressure flow liquids to the up-hole of gas wells along with produced gas. As the reservoir pressure of the gas well decreases with time, gas velocity in a production tubing of the gas well decreases and the velocity of the liquids carried by the gas declines, leading to liquid loading and impairing of gas production. In order to remove excess fluid in gas wells, beam or hydraulic pumping, plunger lift, gas lift, surface compression, velocity string installation, foaming, etc., have been used. However, gas wells with gas flow below critical flow rate do not have enough energy to lift excess fluid by the aforementioned methods. Accordingly, there exists a need for a method for removing excess fluid from low energy gas wells.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for removing liquid buildup in gas wells. The method may include introducing a first aqueous solution comprising a nitrogen-containing compound and a second aqueous solution comprising a nitrite-containing compound and a foaming agent into the wellbore such that the first aqueous solution and the second aqueous solution may intermix within the wellbore. The method may further include maintaining the intermixed solution in the wellbore such that gas, heat, and foam may be generated, and removing the excess fluid from the wellbore.

Other aspects and advantages of the claimed subject matter will be apparent from the following description and the appended claims.

DETAILED DESCRIPTION

Figure 1:
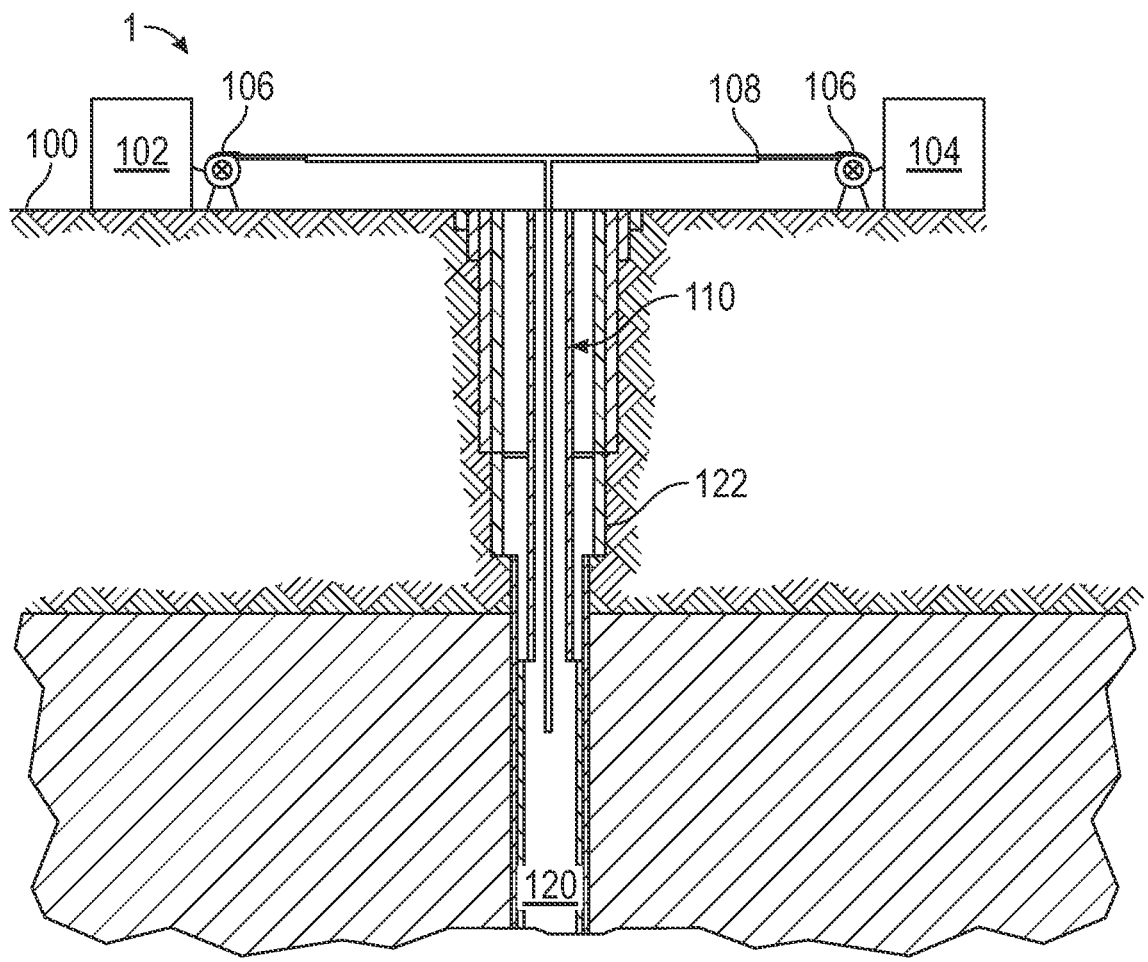
FIG. 1 is a schematic diagram of a system for removing excess fluid in a wellbore in accordance with one or more embodiments.

Specific embodiments of the disclosure will now be described in detail.

In the following Detailed Description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In one or more embodiments, "uphole" may refer to objects, units, or processes that are positioned closer to the surface entry in a wellbore. "Downhole" may refer to objects, units, or processes that are positioned farther from the surface entry in a wellbore.

Embodiments disclosed herein generally relate to methods and compositions to remove excess fluid in low energy gas wells. In one or more embodiments, a first aqueous solution and a second aqueous solution may be introduced into a wellbore. The first aqueous solution may contain nitrogen-containing compounds and the second aqueous solution may contain nitrite-containing compounds. The first aqueous solution and the second aqueous solution may be intermixed and maintained within the wellbore in presence of a foaming agent. A reaction between the nitrogen containing-compounds and the nitrite-containing compounds in the intermixed solution may be initiated by heat or acids, leading to in situ generation of a foam. The generated foam facilitates the removal of excess fluid from the wellbore.

Composition

Aqueous Solutions

In one aspect, embodiments disclosed herein relate to compositions to remove excess fluid in low energy gas wells. The composition may include a first aqueous solution, a second aqueous solution, a foaming agent, and an acid or acid precursor. The first aqueous solution, which includes a nitrogen-containing compound, and the second aqueous solution, which includes a nitrite-containing compound, may be introduced into the wellbore such that they intermix within the wellbore in the presence of the foaming agent.

In one or more embodiments, the first aqueous solution may include nitrogen-containing compounds. In one or more embodiments, the nitrogen-containing compounds may be selected from the group consisting of an ammonium-containing compound, a primary amine-containing compound, and combinations thereof.

In one or more particular embodiments, the ammonium-containing compound disclosed herein may be selected from ammonium-bearing compounds ($NH_4^+$ ion) including but not limited to, ammonium chloride, ammonium bromide, ammonium nitrate, ammonium nitrite, ammonium acetate, ammonium formate, ammonium sulfate, ammonium carbonate, and combinations thereof.

In one or more embodiments, the concentration of ammonium-containing compound included in the first aqueous solution may be in a range of from 2.0 M to 5.0 M. The concentration of ammonium-containing compound included in the first aqueous solution may be in a range having a lower limit of any one of 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, and 4.0, and an upper limit of any one of 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0, where any lower limit may be paired with any mathematically compatible upper limit.

In one or more particular embodiments, examples of primary amine-containing compounds ($RNH_2$) disclosed herein may include, but are not limited to sulfamidic acid, an amino radical, or combinations thereof.

In one or more embodiments, the concentration of the primary amine-containing compound included in the first aqueous solution may be in a range of from 2.0 M to 5.0 M. The concentration of primary amine-containing compound included in the first aqueous solution may be in a range having a lower limit of any one of 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, and 4.0, and an upper limit of any one of 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0, where any lower limit may be paired with any mathematically compatible upper limit.

In one or more embodiments, the first aqueous solution may further include an acid or acid precursor in addition to nitrogen-containing compounds. Acid and acid precursor may be an initiator of a reaction between the nitrogen-containing compound and the nitrite-containing compound. The reaction between the nitrogen-containing compound and nitrite-containing compound will be described in more detail following.

In one or more embodiments, examples of acids may include, but are not limited to weak acids, such as citric acid, propionic acid, benzoic acid, formic acid, and acetic acid; strong acids, such as hydrochloric acid, and diluted strong acids.

In one or more embodiments, examples of acid precursors may include, but are not limited to methyl acetate, ethyl acetate, paraformaldehyde and ammonium persulphate.

In one or more particular embodiments, the concentration of acids or acid precursors included in the first aqueous solution may be in a range of from 0.1 vol % to 5.0 vol %. Specifically in one or more embodiments, when hydrochloric acid is used as an acid, the concentration of hydrochloric acid may be in a range of from 0.01 M to 1.0 M. In contrast, when an organic acid is used, it may be used in a concentration ranging from about 1.0 vol % to 5.0 vol %.

Alternatively, in one or more embodiments, acid precursors may be introduced with a first aqueous solution, or second aqueous solution, or may be introduced into the intermixed solution of the first and second aqueous solution.

In one or more embodiments, the amount and type of acid used may be any acid that is effective in reducing the pH of the intermixed solution in the wellbore to a pH less than 7.0 upon intermixing. Acidic hydrogen atoms at a pH of at or less than about 5.0, such as less than about 4.5, less than about 4.0, less than about 3.5, less than about 3.0, less than about 2.5, less than about 2.0, less than about 1.5, less than about 1.0, or less than about 0.5 in the intermixed solution may initiate the reaction between the nitrogen-containing compound and the nitrite-containing compound.

In one or more embodiments, the second aqueous solution may include nitrite-containing compounds. In one or more particular embodiments, nitrite-containing compounds may be selected from the group consisting of ammonium nitrite, calcium nitrite, sodium nitrite, potassium nitrate, and combinations thereof.

In one or more embodiments, the concentration of the nitrite-containing compounds included in the second aqueous solution may be in a range of from 2.0 M to 5.0 M. The concentration of nitrite-containing compound included in the first aqueous solution may be in a range having a lower limit of any one of 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, and 4.0, and an upper limit of any one of 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0, where any lower limit may be paired with any mathematically compatible upper limit.

In one or more embodiments, the second aqueous solution may further include a foaming agent. The foaming agent may be introduced into the wellbore with the second aqueous solution through the production tubing or a coiled tubing. In one or more particular embodiments, foaming agents may be anionic, cationic, amphoteric (or zwitterionic), or nonionic, and combinations thereof.

The foaming agent may be selected for use in a particular downhole environment. As such, in one or more embodiments, the type of foaming agent used will be selected based on its foamability, foam buildup, foam half-life, overflow of the foam, and thermal stability of the foam under the conditions in which it will be used.

Specifically, in one or more embodiments, the foam buildup may be tested by generating a foam and then measuring the height of the generated foam at arbitrary time. When the foam is built up in a short time, the excess fluid in the wellbore can be removed in a relatively short period of time. Therefore, foaming agents that can build up the foam in a shorter time may be selected for removal of excess fluid.

In one or more embodiments, the foam half-life is the time required for a foam to lose half of its initial height at reservoir conditions. The foam half-life may be tested by generating a foam and then measuring the time it takes for the foam to collapse to half of its maximum volume after being foamed. It is generally known by a person of ordinary skill in the art that the longer the half-life of the foam is, the larger the amount of excess fluid can be removed. Therefore, in one or more embodiments, foaming agents that generate a foam having longer foam half-life may be selected for removal of excess fluid.

In one or more embodiments, the suitability of the foam may be further evaluated using a foam overflow test. In such embodiments, water-condensate blends with a range of condensate cuts (for example, 10, 20 and 50 vol % of condensate) may be mixed with a foaming agent at various concentrations (for example, 5,000, 10,000 and 50000 ppm) and then a foam is generated by the introduction of a gas such as nitrogen. Overflow fluid may be collected and a percentage of the fluid that overflowed may be calculated. The higher the calculated percentage of the overflowed fluid is, the larger the amount of the excess fluid in the wellbore is removed. Therefore, foaming agents with high percentage of overflow may be selected for removal of excess fluid.

In one or more embodiments, thermal stability of the foam may also be tested for selecting foaming agents. In the present disclosure, the term "thermally stable" refers to a foam that does not chemically degrade and is able to maintain various foam properties at high temperature in the wellbore. As used herein, "high temperature" refers to a temperature of at least 100° C. More specifically, it is required that the foaming agent is stable, for example, at about 150° C. The foam requires thermal stability under the conditions of use, meaning downhole temperatures (for example, 100° C. or above). The rheological properties of a generated foam may be measured, for example, using a foam rheometer at ambient temperature and at reservoir temperature to test that the rheological properties do not change at high temperature. Foaming agents that generate a thermally stable foam may be selected for removal of excess fluid. The results of the thermal stability will be described in more detail following.

As may be appreciated by those skilled in the art, the above methods for testing foam buildup, foam half-life, overflow of the foam, and thermal stability of the foam may be used as necessary to appropriately select foaming agents for removal of excess fluid.

In one or more embodiments, examples of the foaming agent may include a nonionic surfactant or mixture of nonionic surfactants, an amphoteric surfactant or a mixture of amphoteric surfactants to avoid adsorption of surfactants with counter ions. Examples of foaming agent may include surfactant, for example, water-soluble, nonionic, and amphoteric surfactants; betaine-based surfactants, viscoelastic surfactants; polymeric surfactants, for example, partially hydrolyzed polyvinyl acetate; partially hydrolyzed modified polyvinyl acetate; block or copolymers of polyethylene, polypropylene, polybutylene and polypentene; proteins; partially hydrolyzed polyvinyl acetate, polyacrylate, and derivatives of polyacrylates; polyvinyl pyrrolidone and derivatives thereof; or combinations thereof. The examples of the foaming agent may be selected by considering the foamability, foam buildup, foam half-life, overflow of the foam, and thermal stability of the foam under the conditions in which it will be used.

A non-limiting example of a suitable commercially available foaming agents is FOAM20505A (Champion X®, LLC).

In one or more embodiments, the initial concentration of the foaming agent included in the second aqueous solution may have a range of from 500 ppm to 50,000 ppm. The concentration of the foaming agent in the second aqueous solution may be in a range having a lower limit of any one of 500, 600, 700, 800, 900, 1,000, 2,000, 3,000, 4,000, 5,000, 6,000, 7,000, 8,000, 9,000, 10,000, 15,000, 20,000, and 25,000, and an upper limit of any one of 20,000, 25,000, 30,000, 35,000, 40,000, 45,000, 49,000, 49,100, 49,200, 49,300, 49,400, 49,500, 49,600, 49700, 49800, 49900, and 50,000 ppm, where any lower limit may be paired with any mathematically compatible upper limit.

In one or more embodiments of the first aqueous solution and the second aqueous solution, water may be a solvent for the nitrogen-containing compounds and the nitrite-containing compounds, respectively. "Water" includes, but is not limited to, freshwater (water having relatively low (that is, less than 5000 ppm) concentrations of total dissolved solids), synthetic or natural seawater (for example, water having a salinity in the range of about 33,000 to about 37,000 ppm, synthetic brines, natural brines, brackish water, production water, formation water, and combinations thereof. For both the first and the second aqueous solutions, and the intermixed solutions, the remainder may be comprised of water.

In Situ Chemical Reaction Between the Nitrogen-Containing Compound and Nitrite-Containing Compound As noted above, the nitrogen-containing compound and the nitrite-containing compound may react to generate heat and produce nitrogen gas. In one or more embodiments, the reaction between the nitrogen-containing compound included in the first aqueous solution and the nitrite-containing compound included in the second aqueous solution may be an oxidation-reduction and may release kinetic and thermal energies (heat) and nitrogen gas as a result.

It is understood that that the terms "ammonium-containing compound," "ammonium ions," "nitrite-containing compound," and "nitrite ions" as used refers to an ionic compound wherein a counter ion is included, for example, for an ammonium-containing compound the ammonium ions may be supplied as ammonium chloride.

In one or more particular embodiments, the first aqueous solution may be a solution of ammonium chloride and the second aqueous solution may be a solution of sodium nitrite. The reactants react upon addition of a proton donor such as an acid or application of heat, and may form nitrogen gas, sodium chloride, water, and heat. Equation (I) shows the reaction between ammonium chloride and sodium nitrite:

$$NH_4Cl + NaNO_2 \rightarrow N_2(g) + NaCl + 2H_2O + Heat \quad \text{Equation (I)}$$

The reaction of Equation (I) releases approximately 75 kcal/mol (kilocalories per mole). The reaction requires the addition of acid or heat. Although Equation (I) is shown using ammonium-chloride as an example of a nitrogen-containing compound and sodium nitrite as an example of nitrite-containing compound the scope of the technology is not so limited.

In one or more embodiments, equal molar amounts of the nitrogen-containing compounds and the nitrite-containing compounds are introduced into the wellbore. In one or more embodiments, up to about 5%, or up to about 10% excess, of either component may be employed. Thus, in one or more particular embodiments, the ratio of nitrogen-containing compounds to nitrite-containing compounds in the aqueous solutions may be in a range from between about 1.1:1 to 1:1.1, between about 1.05:1 and 1:1.05, and about 1:1 when the reaction between the nitrogen-containing compound and nitrite-containing compound is initiated by heat.

In one or more embodiments, the molar ratio of the nitrogen-containing compound in the first aqueous solution and the concentration of the nitrite-containing compound in the second aqueous solution may be about 1:2 when the reaction between nitrogen-containing compound and nitrite-containing compound is initiated by acid.

In one or more embodiments, the molarity of the first aqueous solution and the second aqueous solution may be substantially equivalent. In such an embodiment, the volume ratio of the first aqueous solution to the second aqueous solution is about 1:1. In such instances, the molar concentrations of the nitrogen-containing compound and the nitrite-containing compound may vary to permit the volumes to be substantially equivalent. For example, the first aqueous solution may have a molarity of about 7 (7M) of a nitrogen-containing compound, such as an ammonium-containing compound, such as ammonium chloride, and the second solution may have a molarity that is about twice as much, for example, about 12 to about 13 M, of nitrite-containing compound, such as sodium nitrite, while the volumes of each solution introduced are substantially equivalent. Using similar to equal volumes of the first and the second aqueous solution but at different molarities provides for ease of administration and monitoring of the introduction of the two fluids in the field. Similar pumps running the two fluids can introduce the solutions to the wellbore at similar pumping rates.

In Situ Generated Foam

In one or more embodiments, a foam may be generated in situ by performing the chemical reaction between the nitrogen-containing compounds and nitrite-containing compounds in the presence of a foaming agent. The properties of the generated foam, such as foam quality, viscosity, and half-life, contribute to effective removal of liquid buildup in the wellbore.

The foams described herein may have a suitable foam quality for removal of excess fluid downhole. The term "foam quality" is a ratio of gas volume to foam volume (gas+liquid) at a certain pressure and temperature. Foam quality under certain pressure and temperatures is determined by measuring the ratio between gas volume and the total foam volume including gas and liquid phases. It is an important factor in determining foam stability and viscosity. Foam quality (F) as defined above is the ratio of gas volume to gas/liquid volume over a given temperature and pressure, and may be determined using Equation (II) below:

$$\Gamma = \frac{100 V_g}{V_g + V_l} \quad \text{(II)}$$

where $V_g$ is the gas volume and Vl is the liquid volume.

In foams that have a foam quality below about 50%, gas bubbles do not generally come in contact with each other. These foams have low foam viscosity and include a large volume of free liquid. Foam qualities ranging from 50% to 90% indicate a foam in which gas bubbles are in contact with each other, resulting in an increased foam viscosity. In one or more embodiments, the quality of the foam of the present disclosure may be in a range of from 52% to 96%. The quality of the generated foam may be in a range having a lower limit of any one of 52, 53, 54, 55, 56 57, 58, 59, 60, 65, 70, 75, and 80%, and an upper limit of any one of 65, 70, 75, 80, 85, 90, 91, 92, 93, 94, 95, and 96%, where any lower limit may be paired with any mathematically compatible upper limit.

Generally, the temperature and pressure of the wellbore increases as the wellbore gets deeper. Therefore, in one or more embodiments, the foams are required to be thermally stable in order to remove excess fluid in the downhole of the wellbore where the temperature is high. In the present disclosure, the term "thermally stable" refers to a foam that does not chemically degrade and is able to maintain various foam properties at high temperature, as discussed above. The foam may be thermally stable under the conditions of use, meaning downhole temperatures and pressures. For example, in one or more embodiments, the foam may be thermally stable at a temperature range of from about 120° C. to 165° C., making it suitable for downhole conditions. The foam may be thermally stable at a temperature range having a lower limit of any one of 120, 121, 122, 123, 124, 125, 126, 127, 128, 129, 130, 135, 140, 145, and 150° C., and an upper limit of any one of 135, 140, 145, 150, 155, 156, 157, 158, 159, 160, 161, 162, 163, 164, and 165° C., where any lower limit may be paired with any mathematically compatible upper limit. However, as will be appreciated by those skilled in the art, the foam may be thermally stable under a different temperature range depending on the specific downhole conditions.

In one or more embodiments, the foam half-life is the time required for a foam to lose half of its initial height at reservoir conditions. The foam may have a half-life in a range of a few seconds, to few minutes. In some embodiments, the foam has a foam half-life of at least about 24 hours.

Method for Removing Excess Fluid in Wellbores

Gas wells with gas flow below critical flow rate do not have enough energy to lift excess fluid such as formation fluids, water, gas condensate, or combinations thereof. The accumulation of excess fluid leads to liquid buildup and impairs gas production from gas wells. Thus, one or more embodiments disclosed herein relate to a method for removing excess fluid in wellbores with an in situ generated foam made from the composition described above.

In one aspect, embodiments disclosed herein relate to methods for removing excess fluid in low energy gas wells. In one or more embodiments, a first aqueous solution comprising nitrogen-containing compounds and a second aqueous solution comprising nitrite-containing compounds may be introduced into a wellbore. In some embodiments, the first aqueous solution may further include an acid or acid precursor and the second aqueous solution may further include a foaming agent. Alternatively, in one or more embodiments, acid precursors may be included in the second aqueous solution, or may be added to the intermixed solution of the first and second aqueous solution. Both the first and second aqueous solutions are introduced into the wellbore such that they intermix within the wellbore. The intermixed solution may be maintained in the wellbore such that the foaming agent reduces surface tension of the excess fluid and that gas, heat, and foam may be generated in the wellbore by the in situ reaction between the nitrogen-containing compound and the nitrite-containing compound. The generated foam is lifted up by the flow of in situ generated gas and removes the excess fluid from the wellbore.

FIG. 1 illustrates a system 1 in accordance with one or more embodiments for removing excess fluid from gas wells. As shown in FIG. 1, a downhole formation is depicted having a wellbore wall 122 extending downward from a surface 100 into the formation, defining a wellbore 120. Coiled tubing 108 and production tubing 110 may extend downward from the surface 100 to the downhole of the wellbore 120.

The system 1 illustrated in FIG. 1 may have a tank 102 containing a first aqueous solution and another tank 104 containing a second aqueous solution. The first aqueous solution and the second aqueous solution are as previously described. The second aqueous solution may include a foaming agent as described above. The first aqueous solution and the second aqueous solution may be introduced simultaneously into the wellbore 120. In one or more embodiments, the first aqueous solution including nitrogen-containing compounds may be introduced from the tank 102 into the wellbore 120 via a pump 106 through the coiled tubing 108 and the production tubing 110. The second aqueous solution including nitrite-containing compounds may be introduced from the tank 104 into the wellbore 120 via a pump 106 through the coiled tubing 108 and the production tubing 110. After introducing the first and second aqueous solution, the two aqueous solutions may intermix within the wellbore 120. In system 1 of FIG. 1, the reaction between the nitrogen-containing compounds and the nitrite-containing compounds in the intermixed solution may be initiated by heat.

Figure 2:
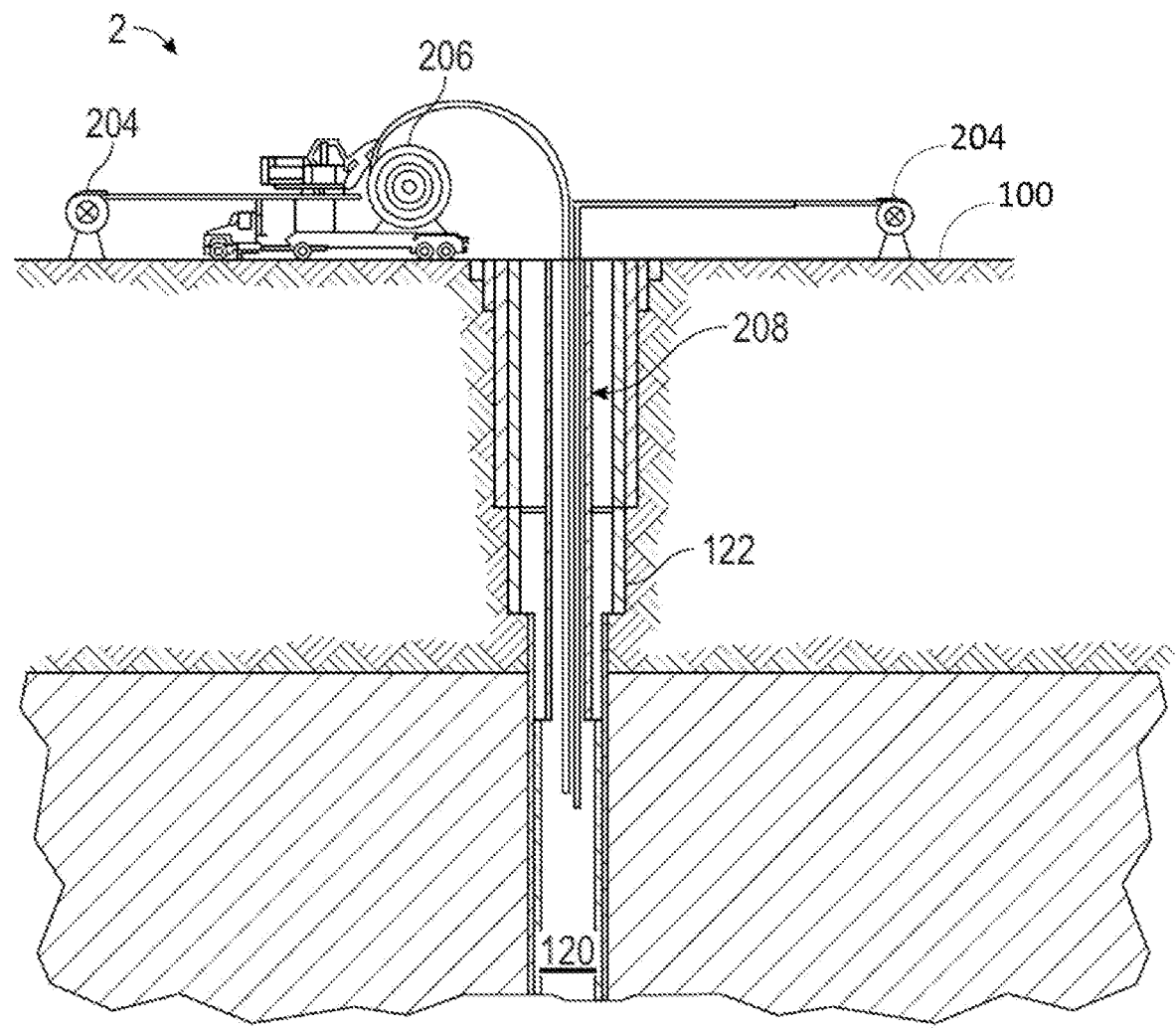
FIG. 2 is a schematic diagram of an alternative system for removing excess fluid in a wellbore in accordance with one or more embodiments.

FIG. 2 illustrates another embodiment of a system in accordance with one or more embodiments. As shown in FIG. 2, a downhole formation is depicted having a wellbore wall 122 extending downward from a surface 100 into the formation, defining a wellbore 120. Coiled tubing 206 and production tubing 208 may extend from the uphole to the downhole of the wellbore 120.

In the system 2 illustrated in FIG. 2, a first aqueous solution and a second aqueous solution may be introduced separately into the wellbore 120. In one or more embodiments, the first aqueous solution containing nitrogen-containing compounds may be introduced into the wellbore 120 via a pump 204 through the coiled tubing 206. The second aqueous solution containing nitrite-containing compounds may be introduced into the wellbore 120 using a pump 204 or a bullheading through the production tubing 208. In such instances, the second aqueous solution may be introduced at a different timing from the introduction of the first aqueous solution. The first and second aqueous solution may intermix within the wellbore 120. In one or more embodiments, the first solution may further include an acid or acid precursor and the second solution may further include a foaming agent. In system 2 of FIG. 2, the acid or acid precursor may initiate the reaction between the nitrogen-containing compounds and the nitrite-containing compounds in the intermixed solution.

Figure 3:
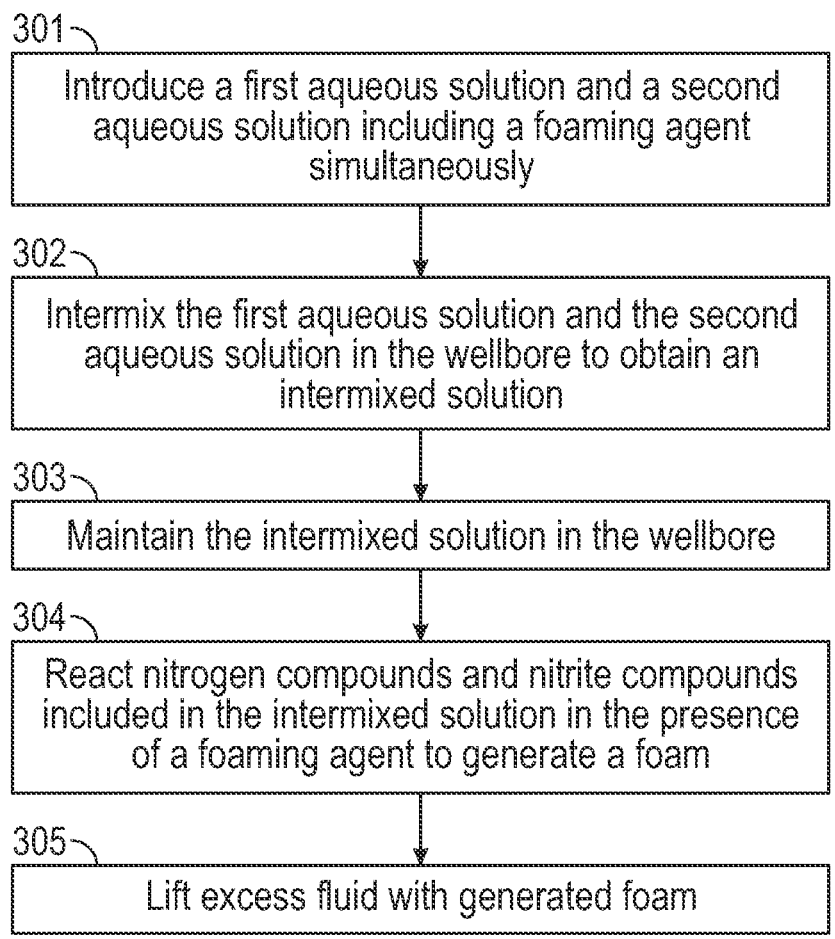
FIGS. 3 and 4 are flow charts of methods for removing excess fluid in a wellbore in accordance with one or more embodiments.
Figure 4:
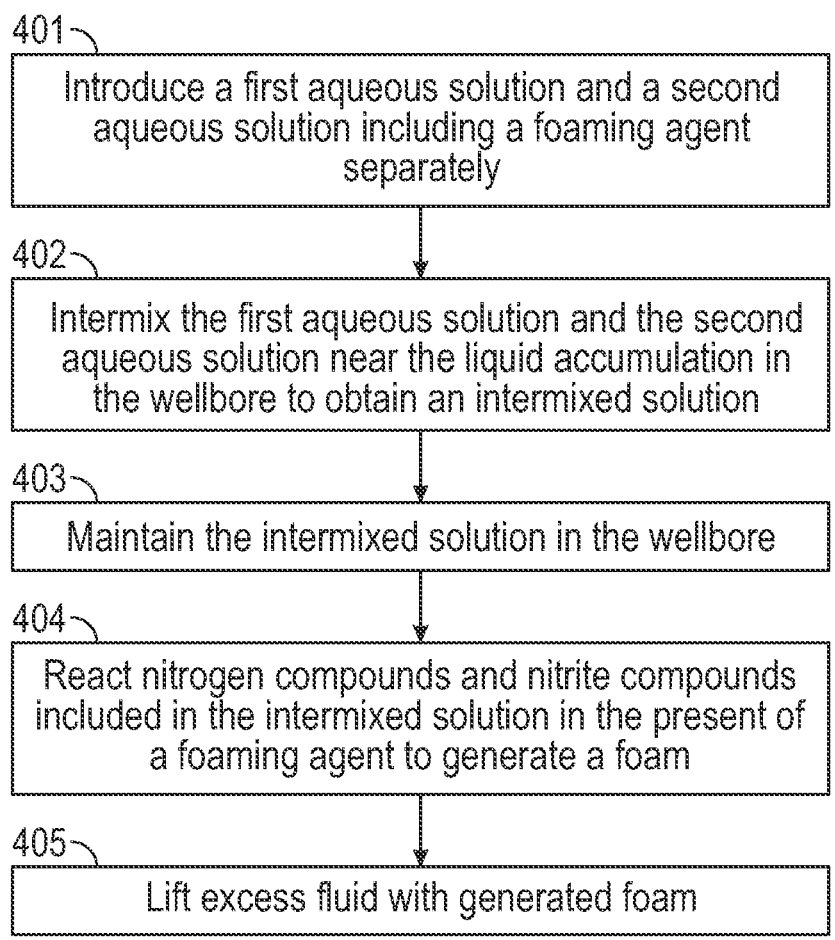

FIGS. 3 and 4 show flowcharts of methods for removing excess fluid from gas wells in accordance with one or more embodiments.

As shown in FIG. 3 and referring back to FIG. 1, at step 301, the first aqueous solution and the second aqueous solution containing a foaming agent may be introduced into the wellbore simultaneously in accordance with one or more embodiments. For example, as previously described, the first aqueous solution and the second aqueous solution containing a foaming agent may be introduced through the coiled tubing that is extended downward into the wellbore.

In one or more embodiments, after introducing the first aqueous solution and the second aqueous solution including a foaming agent, the two aqueous solutions intermix within the wellbore (step 302). The intermixed solution may be maintained in the wellbore (step 303) until the foam is generated in situ from the reaction between the nitrogen-containing compound and the nitrite-containing compound in the presence of the foaming agent (step 304). The maintaining of the intermixed solution may be performed, for example, for at least 12 hours. After generating the foam, the excess fluid may be removed by flowing the well with the foam and lifting excess fluid up to the surface of the wellbore (step 305).

Alternatively, in one or more embodiments, the first aqueous solution and the second aqueous solution containing a foaming agent may be introduced into the wellbore separately. For example, as shown in FIG. 4 and referring back to FIG. 2, at step 401, the first aqueous solution may be introduced through the coiled tubing and the second aqueous solution containing a foaming agent may be introduced through the production tubing at different timings. In such instance, the two solutions can be maintained separately until the moment of introduction into the wellbore, where they begin to intermix near the liquid accumulation within the wellbore (step 402). The intermixed solution may be maintained in the wellbore (step 403) until the foam is generated in situ from the reaction between the nitrogen-containing compound and the nitrite-containing compound in the presence of the foaming agent (step 404). After generating the foam, the excess fluid may be removed (step 405) as discussed above.

In one or more embodiments, the reaction between the nitrogen-containing compound and the nitrite-containing compound may be initiated by heat of the wellbore. Heat from elevated temperatures within the wellbore as compared to the surface of the wellbore can cause the reaction between the ammonium-containing compound and the nitrite-containing compound to initiate. In one or more embodiments, the temperature of the wellbore may be at least about 60° C. or more.

The reaction of the intermixed solution may be delayed by introducing the first aqueous solution, the second aqueous solution, or both, into the wellbore at a temperature less than the temperature of the wellbore. In doing so, upon introduction of a relatively cooler solution into the wellbore, heat will flow from the relatively warmer wellbore into the cooler solution until either the solution is at ambient conditions of the wellbore or the foaming reaction is triggered in the intermixed solution, whichever comes first. For example, a solution of ammonium chloride, a nitrogen-containing compound, such as an ammonium-containing compound, is known to have a molar solubility in water of up to 5.49M at 0° C. and 7.16M at 25° C. As well, a solution of sodium nitrite, a nitrite-containing compound, is known to have a molar solubility in water of up to 10.20M at 0° C. and 12.29M at 25° C. These molar quantities at the reduced temperatures are sufficient to support the wellbore of the foam in situ. In addition, their solubility at reduced temperatures indicates that nitrogen-containing compounds and nitrite-containing compounds can be provided in sufficient quantities at the reduced introduction temperatures to create a reaction at greater formation temperatures.

In one or more embodiments, the temperature at which the first solution is introduced into the formation may be less than the temperature of the wellbore. In such embodiments, the temperature in which the first solution is introduced may be greater than about 0° C. and less than about 60° C. In one or more particular embodiments, the temperature of the first aqueous solution may be in a range of from greater than 0° C. to less than 60° C. The temperature of the first aqueous solution may be in a range having a lower limit of any one of 0, 1, 2, 3, 4, 5, 6, 7, 8, 9, 10, 15, 20, 25, 30, 35, and 40° C., and an upper limit of any one of 20, 25, 30, 35, 40, 45, 50, 51, 52, 53, 54, 55, 56, 57, 58, 59, and 60° C., where any lower limit may be paired with any mathematically compatible upper limit.

In one or more embodiments, the temperature at which the second aqueous solution is introduced into the wellbore may be less than the temperature of the wellbore. In such embodiments, the temperature in which the second solution is introduced may be greater than about 0° C. and less than about 60° C. In one or more particular embodiments, the temperature of the second solution may be in a range of from greater than 0° C. to less than 60° C. The temperature of the first aqueous solution may be in a range having a lower limit of any one of 0, 1, 2, 3, 4, 5, 6, 7, 8, 9, 10, 15, 20, 25, 30, 35, and 40° C., and an upper limit of any one of 20, 25, 30, 35, 40, 45, 50, 51, 52, 53, 54, 55, 56, 57, 58, 59, and 60° C., where any lower limit may be paired with any mathematically compatible upper limit.

In some instances, it may be useful to have the product foam form instantly upon the first aqueous solution and the second aqueous solution contacting each other and forming the intermixed solution. The reaction between the two aqueous solutions may occur immediately upon intermixing by introducing the first aqueous solution, the second aqueous solution, or both, into the wellbore at a temperature sufficient for the intermixed solution to be at or greater than about 60° C. In some embodiments, the temperature in which the first aqueous solution is introduced may be greater than about 60° C. In some embodiments, the temperature in which the second aqueous solution is introduced may be greater than about 60° C. In some embodiments, the temperature in which the first and the second aqueous solution are introduced may be the same and may be greater than about 60° C. In some embodiments, the temperature in which the first aqueous solution is introduced may be such that the temperature of the intermixed solution in the wellbore may be greater than 60° C. In some embodiments, the temperature in which the second aqueous solution is introduced such that the temperature of the intermixed solution in the wellbore may be greater than 60° C.

In one or more particular embodiments, the concentration of acids or acid precursors may be such that the pH of the intermixed solution in the wellbore may be at or less than about 7.0, such as less than about 6.5, or less than about 6.0, less than about 5.5, less than about 5.0, less than about 4.5, less than about 4.0, less than about 3.5, less than about 3.0, less than about 2.5, less than about 2.0, less than about 1.5, less than about 1.0, or less than about 0.5. The intermixed solution may be maintained to have a pH of equal to about 7.0 or less until a foam is generated in situ from the reaction between the nitrogen-containing compound and the nitrite-containing compound in the presence of the foaming agent.

Alternatively, in one or more embodiments, acids or acid precursors may be contained in the first aqueous solution that includes nitrogen-containing compounds. The concentration of acids in the first aqueous solution may be such that the pH of the intermixed solution in the wellbore may be at or less than about 7.0, as described previously. In one or more embodiments, acid precursors may be contained in the second aqueous solution or may be introduced to the intermixed solution of the first and second aqueous solution.

EXAMPLES

Removal of Excess Fluid with Different Concentration of Condensate and Foaming Agents Removal of excess fluid with different concentration of condensate and different concentration of foaming agents included in the second aqueous solution was evaluated.

Table 1 shows Examples with different concentrations of condensate water and concentrations of foaming agents. The removed excess fluid over time is evaluated for each Example.

TABLE 1

Removal of Excess Fluid of Examples with Different Concentration of Condensate and Foaming agents

|  | EXAMPLE 1 | EXAMPLE 2 | EXAMPLE 3 |
| --- | --- | --- | --- |
| Temperature of excess fluid [° C.] | 80 | 80 | 80 |
| Concentration of condensate water [%] | 10 | 20 | 50 |
| Concentration of foaming agent [wt %] | 0.5 | 0.5 | 5.0 |
| Start of the removal of excess fluid [sec] | 150 | 220 | 80 |

Figure 5:
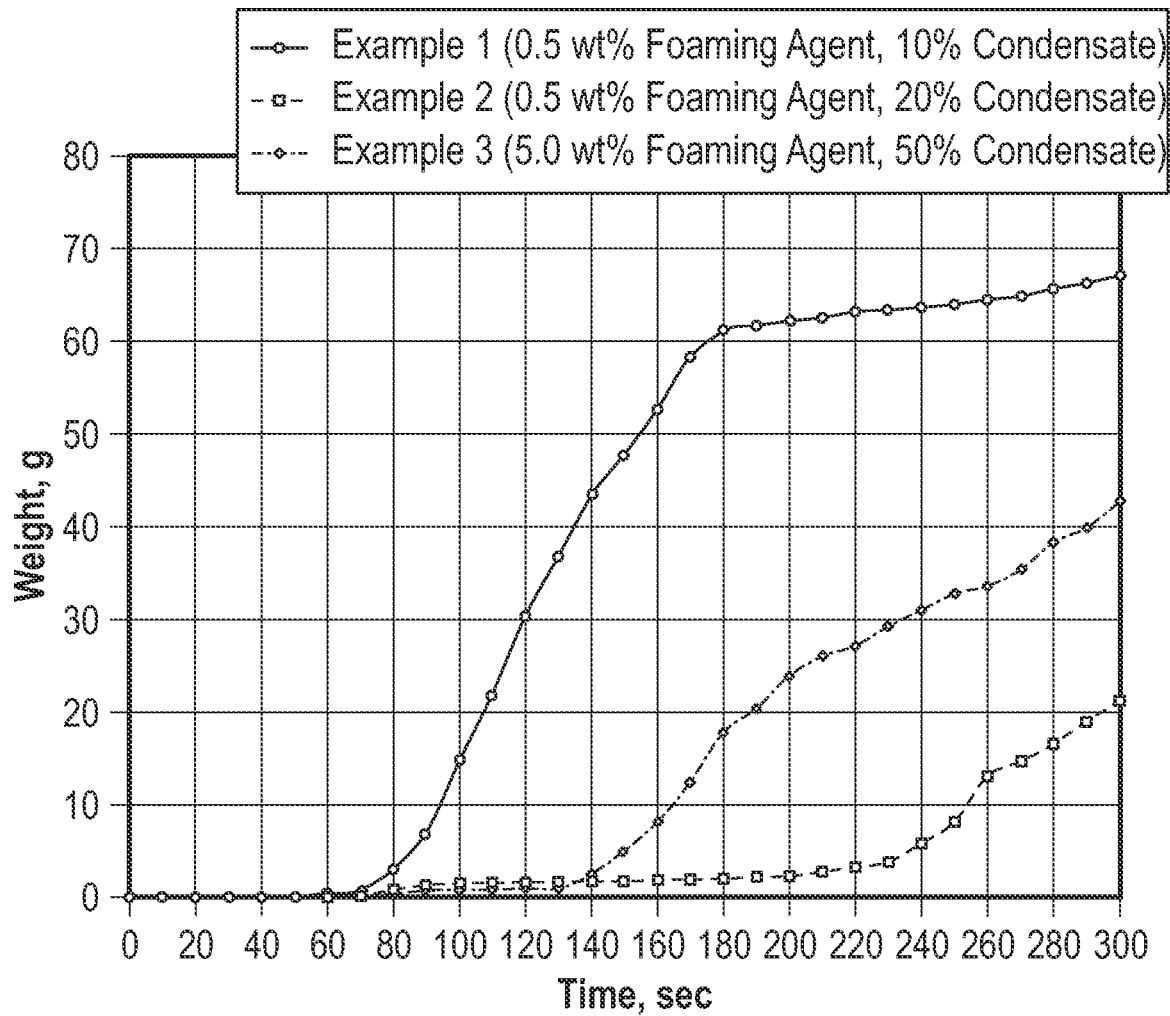
FIG. 5 shows time dependence of removing excess fluid with different concentrations of condensate water and different concentrations of foaming agents.

FIG. 5 shows the time dependence of the removal of excess fluid of the Examples and the amount of removed excess fluid over time.

As shown in Table 1 and FIG. 5, in Examples 1 and 2 having a foaming agent at a concentration of 0.5 wt %, removal of excess fluid occurs from 150 seconds and 220 seconds respectively. Meanwhile, in Example 3 having foaming agent at a concentration of 5 wt %, which is greater than Examples 1 and 2, removal of excess fluid starts from 80 seconds. This result shows that the removing speed of excess fluid depends on the amount of foaming agent and that the removing speed increases as the introduced amount of foaming agent increases.

Embodiments of the present disclosure may provide at least one of the following advantages. The disclosed method may remove excess fluid from gas wells with gas flow below critical flow rate that do not have enough energy to lift excess fluid.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

"Optionally" and all grammatical variations thereof as used refers to a subsequently described event or circumstance that may or may not occur. The description includes instances where the event or circumstance occurs and instances where it does not occur.

The term "substantially" and all grammatical variations thereof as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it is to be understood that another one or more embodiments are from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Thus, particular implementations of the subject matter have been described. Other implementations are within the scope of the following claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for removing excess fluid in a wellbore, the method comprising:
   introducing a first aqueous solution comprising a nitrogen-containing compound and a second aqueous solution comprising a nitrite-containing compound and a foaming agent into the wellbore such that the first aqueous solution and the second aqueous solution intermix within the wellbore;

maintaining the intermixed solution in the wellbore such that gas, heat, and foam are generated; and removing the excess fluid from the wellbore, wherein the foaming agent is selected from the group consisting of partially hydrolyzed polyvinyl acetate, partially hydrolyzed modified polyvinyl acetate, block or copolymers of polyethylene, polypropylene, polybutylene and polypentene, proteins, partially hydrolyzed polyvinyl acetate, polyacrylate, and derivatives of polyacrylates, polyvinyl pyrrolidone and derivatives thereof, or combinations thereof.

2. The method of claim 1, wherein the nitrogen-containing compound is selected from the group consisting of an ammonium-containing compound, a primary amine-containing compound, and combinations thereof.

3. The method of claim 2, wherein the ammonium-containing compound is selected from the group consisting of, ammonium chloride, ammonium bromide, ammonium nitrate, ammonium nitrite, ammonium acetate, ammonium formate, ammonium sulfate, ammonium carbonate, and combinations thereof.

4. The method of claim 2, wherein the primary amine-containing compound is selected from the group consisting of sulfamidic acid, an amino radical, and combinations thereof.

5. The method of claim 1, wherein the nitrite-containing compound is selected from the group consisting of ammonium nitrite, calcium nitrite, sodium nitrite, potassium nitrate, and combinations thereof.

6. The method of claim 1, wherein the first aqueous solution and the second aqueous solution are simultaneously introduced into the wellbore.

7. The method of claim 1, wherein the first aqueous solution and the second aqueous solution are separately introduced into the wellbore.

8. The method of claim 1, wherein a temperature of the intermixed solution in the wellbore is 110° C. or more.

9. The method of claim 1, wherein a molar ratio of a concentration of the nitrogen containing compound in the first aqueous solution and a concentration of the nitrite-containing compound in the second aqueous solution is in a range of about 1:1 to 1:2.

10. The method of claim 1, wherein a concentration of the nitrite-containing compound in the first aqueous solution and the nitrite-containing compound in the second aqueous solution is in a range of from 2 M to 5 M.

11. The method of claim 1, wherein a concentration of the foaming agent included in the second aqueous solution is in a range of from 500 ppm to 50,000 ppm.

12. The method of claim 1, wherein a quality of the foam generated in the wellbore is in a range of from 52% to 96%.

13. The method of claim 1, wherein the foam is thermally stable at a temperature range of from 120° C. to 165° C.

14. The method of claim 1 further comprising:
introducing an acid or an acid precursor into the wellbore;
releasing an acid from the acid precursor into the intermixed solution; and
maintaining the acid with the intermixed solution in the wellbore such that pH of the intermixed solution is adjusted to less than 7.0.

15. The method of claim 14, wherein the first aqueous solution comprises the acid or acid precursor.

16. The method of claim 14, wherein the acid is selected from the group consisting of hydrochloric acid, citric acid, propionic acid, benzoic acid, formic acid, acetic acid, and combinations thereof and the acid precursor is selected from the group consisting of methyl acetate, ethyl acetate, paraformaldehyde, ammonium persulphate and combinations thereof.

* * * * *